Jan. 17, 1961
H. D. JOHNSON
2,968,172
DETECTING SYSTEM
Filed Feb. 10, 1958
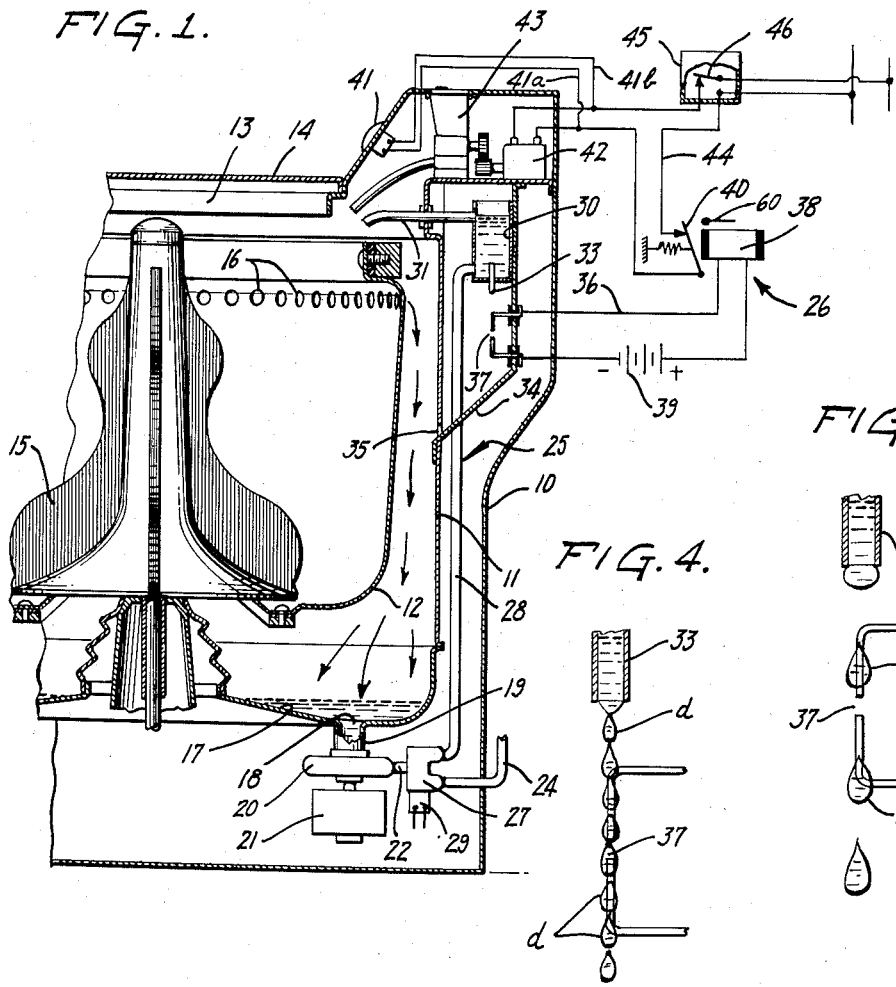
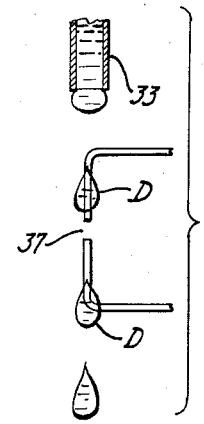
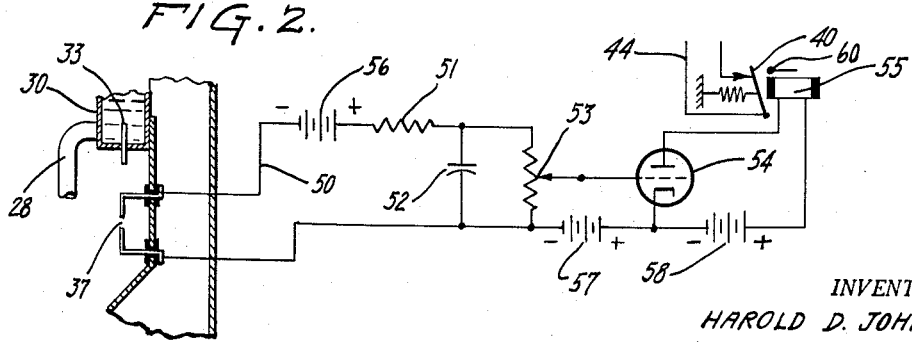
INVENTOR.
HAROLD D. JOHNSON
BY
*Albert H. Charland*
ATTORNEY United States Patent Office 2,968,172
Patented Jan. 17, 1961

2,968,172
DETECTING SYSTEM

Harold D. Johnson, Largo, Fla., assignor to Philco Corporation, Philadelphia, Pa., a corporation of Pennsylvania Filed Feb. 10, 1958, Ser. No. 714,372

11 Claims. (Cl. 68—17)

The invention herein disclosed and claimed relates generally to detecting systems and pertains more particularly to systems for determining certain conditions and properties of liquids. Specifically the invention has to do with a system for testing a solution of detergent and water in a washing machine, the system being adapted to indicate the detergency condition of the solution and being capable of effecting automatic addition of detergent to the solution if the need for such addition is indicated.

Although suitable for use with various machines, the novel arrangement of this invention is especially useful when applied to domestic washing machines of the kind which function automatically to wash clothes by going through successive washing, rinsing and liquid-extracting cycles. With machines of this character, it is important that a correct amount of detergent be present in the wash water in order to obtain satisfactory washing of clothes. Usually a producer of detergent supplies instructions as to average amounts of its product to be added to the water in the tub of a washing machine. However variable factors such as the hardness of the water, the kind and quantity of clothes in a load put in the washing machine and the amount and kind of soil contained in the clothes, make it difficult to determine with exactitude the total amount of detergent to be added to the water in order to obtain optimum washing action.

It is therefore an object of the present invention to insure that a washing solution contains the proper amount of detergent to obtain adequate washing of a load of clothes in a washing machine.

Another object of the invention is to provide for testing of a liquid in an enclosure to sense the surface tension of the liquid and thereby determine its detergency.

It is also an object of this invention to provide for automatic addition of detergent to a washing solution in amounts controlled in direct relation to the condition of the solution.

A characteristic feature of the present invention resides in the provision of a novel system in which physical condiitons of a liquid are utilized to detect its cleansing quality.

The invention is moreover distinguished by the fact that a novel system of the character above mentioned, can be readily incorporated in an automatic clothes washing machine without material changes in its basic structure and without affecting its usual mode of operation.

It is generally known that when liquid is discharged through a capillary orifice or tube at a constant rate of flow in the form of drops, the dropping frequency is affected by surface tension of the liquid since surface tension controls the size of the drops, and the size of the drops in turn determines the dropping frequency. It is likewise known that the amount of detergent in a washing liquid affects the surface tension of said liquid and that the surface tension of the liquid decreases when the amount of detergent therein increases. The invention utilizes these known principles to achieve the above noted objects and features and, in its broader aspect, employs a novel arrangement comprising liquid-circulating means and control apparatus. In a preferred embodiment, the circulating means provides for circulation of washing liquid to and from the washing enclosure, and includes a portion for by-passing a quantity of the circulating liquid and delivering it to the control apparatus, the latter functioning in response to the liquid delivered thereto.

In a specific embodiment suitable for use with an automatic washing machine, the control apparatus incorporates a frequency sensitive device included in an electrical circuit adapted to be controlled by washing water emanating from a by-pass portion in liquid-circulating means. This portion is in the form of a capillary passage which imposes frictional resistance to the flow of the washing water so as to discharge the water in drops, the size of the drops and the rate at which they are discharged being affected by the surface tension of the water. Plain water or water of low active detergency (higher surface tension) is discharged from the capillary passage in larger drops and at slower rate. Under this condition of operation the larger drops bridge a gap in the electrical circuit of the frequency sensitive device but the bridging of said gap is momentary and occurs at widely spaced intervals so that impulses produced by the dropping water are insufficiently rapid to effect activation of the frequency sensitive device. However, water of higher active detergency (lower surface tension) is discharged from the capillary passage in smaller drops and at faster rate. Under this latter condition, the smaller drops bridge the mentioned electrical circuit gap in rapid succession so that the resulting electrical impulses attain a frequency rate required to effect activation of the frequency sensitive device.

According to a specific complete system incorporating the above noted arrangement, the frequency sensitive device is associated with signaling instrumentalities for indicating low detergency, as well as with dispensing instrumentalities for automatically adding detergent to obtain a desired detergency value.

As indicated hereinabove, the system of the invention may be utilized in machines of various types. However because the system is particularly applicable to automatic clothes washing machines for domestic use, the specific embodiment herein given by way of example, is illustrated and will be described in connection with such a machine. Accordingly, in the drawings:

Figure 1 is a fragmentary sectional view of a portion of an automatic washing machine incorporating a preferred form of the novel system of the invention, certain elements of the system being represented diagrammatically for simplicity of illustration;

Figure 2 is a diagrammatic representation of a modified form of the system; and

Figures 3 and 4 are enlarged views schematically illustrating two conditions which affect the operation of a system as shown in either of Figures 1 and 2.

Having more particular reference to the drawing, there is illustrated in Figure 1, a domestic clothes washing machine which includes an outer casing or cabinet 10 housing a fixed enclosure or tub 11 which encircles a rotatable washing basket 12. The cabinet has an open top portion 13 which is provided with a cover 14 to give access to said washing basket.

Water at proper temperature is supplied to the washing basket through conventional hot and cold water supplying means (not shown). Clothes are washed in the basket 12 by action of a bladed agitator 15 and, after washing, are rinsed and then damp-dried by spinning of the basket.

During spinning, water is expelled from the basket 12 into the tub 11 through a row of apertures 16 adjacent the top portion of the basket. Water in the tub 11, accumulates in a sump 17 and thence passes out through an opening 18 into the inlet 19 of a pump 20 driven by a motor 21. The outlet 22 of the pump communicates with a discharge duct 24 which leads to a suitable drain for disposal of the water.

In particular accordance with the present invention and as previously indicated, the machine is provided with a system for detecting the detergency of the liquid in the washing basket 12. The system basically comprises liquid circulating means designated generally at 25, and controlling means generally designated at 26.

As shown in Figure 1, the liquid circulating means 25 conveniently includes a valve 27 which is interposed between the pump outlet 22 and the discharge duct 24 and which is connected with a conduit 28. The valve 27 can be of any known construction and, as illustrated in the drawing, is of the conventional type having a solenoid 29 operable to establish selective communication between the discharge side of the pump 20 and either the duct 24 or conduit 28. This conduit discharges into a chamber or header 30 having a nozzle 31 disposed to direct liquid into the basket 12 through the open top thereof. The header 30 is constructed and arranged so that liquid therein also passes outwardly thereof through a restricted passage 33 in the convenient form of a capillary tube which extends through the bottom of said header and into a trough-like member 34. This member leads to an opening 35 in an upper portion of the wall of the tub 11 so that water emitted through the passage 33 as well as water which may flow over the top of the header, can return to the tub 11.

Liquid passing out of the header 30 through the passage 33 is utilized to effect operation of the controlling means 26. For that purpose the controlling means comprises an electrical circuit 36 having a gap 37 located below and in line with said passage 33 so that liquid emitted therefrom can span and close said gap to energize a control device in said circuit. As shown, the control device is a frequency responsive relay 38 and, in the embodiment illustrated in Figure 1, the relay receives its energy from a suitable source of D.C. current such as a battery 39 in the circuit 36, and functions to attract and hold a normally retracted armature 40 when impulses of predetermined frequency are supplied to the relay.

As seen in Figure 1, the relay controls the operation of signalling device or indicator 41, for example a pilot light, and also controls a motor 42 which drives a detergent dispenser 43. The indicator is connected by means of leads 41a and 41b, across a circuit 44 which electrically couples the motor 42 to the relay 38 and to a timer 45 of the kind customarily incorporated in automatic washing machines. However, the timer is provided with an additional switch schematically represented at 46 for controlling said circuit so that energy is supplied to the indicator 41 and motor 42 only when the relay armature 40 and the timer switch 46 are both in position to complete the circuit. The timer function is such that the circuit is completed only during a washing cycle so that the indicator and dispenser remain deenergized during rinsing and spinning cycles even though the relay may then be in circuit closing position.

When starting a washing machine equipped with the above described circulating means and controlling means, the valve 27 is set by function of the timer 45 to place the drain duct 24 out of communication with the pump 20 and to place the conduit 28 in communication with the pump. The timer also closes the switch 46 so that electrical current can flow to and energize the indicator 41 and the dispenser motor 42 through the circuit 44.

With the machine thus set, water is introduced into the washing basket 12 to fill the same up to a level reaching the apertures 16 so that water overflows through said apertures, as represented by arrows in Figure 1, into the sump 17 of the tub 11. From the sump, water is circulated by the pump 20 through the conduit 28 into the header 30 and thence through the nozzle 31 back into the washing basket. This circulation of water continues throughout the washing cycle, and a constant quantity of water from the header 30 passes through the capillary passage or tube 33 and drips therefrom in drops which slide across the gap 37 in circuit 36 of the control relay 38.

Because liquid having high surface tension is emitted from the capillary passage in larger drops and at slower rate than liquid having low surface tension, and because detergent contained in water directly affects its surface tension (the lower the detergent content the higher the surface tension) it will be understood that when plain water or water of low detergency is circulated through the machine, there occurs a condition similar to the one diagrammatically represented in Figure 3. When such a condition exists the larger drops D slip past the gap 37 at a rate too slow to cause reaction of the frequency sensitive relay 38. Accordingly the relay armature 40 remains in its retracted position wherein it cooperates with the timer switch 46 to close the indicator and the dispenser circuit 44 thereby energizing the indicator 41 to signal inadequate detergency and activate the motor 42 to drive the dispenser 43 for automatically adding detergent to the water in a washing basket 12.

As detergent is dispensed in and mixes with the water within the washing basket, the surface tension becomes lower and lower so that the drops emitted by the capillary tube 33 become smaller and smaller and slide across the gap 37 at faster and faster rate until a condition similar to the one diagrammatically represented in Figure 4 is obtained. When such a condition prevails, the small drops d race across the gap 37 at a rapidity sufficient to energize the frequency sensitive relay 38 whereupon its armature 40 is attracted. As a result the circuit 44 is opened thereby deenergizing the indicator and dispenser. At that moment the timer could be made to function for shifting the valve 27 and for opening the switch 46 so as to disable the circulating means and to render the indicating means ineffective. However because of the possibility that the washing water may lose detergency in the process of washing the clothes, it is preferable that the circulating means and the indicating means be kept in condition for operation throughout the entire washing cycle so that more detergent may be added to the wash water should it lose its ability to adequately wash the clothes. At the end of the washing cycle, the circulating means and the dispensing means are rendered inoperative by opening of the timer switch 46, and the machine proceeds in the customary fashion through its rinsing and spinning operations.

In Figure 2 there is shown a modified circuit arrangement employing a frequency sensitive electronic device for controlling the operation of the indicator and of the dispenser motor.

As shown the gap 37 is interposed in a circuit 50 which includes a charging resistor 51, a capacitor 52, a potentiometer 53, a vacuum tube 54 and a relay 55. The vacuum tube is of known suitable type, such as a triode, and power supply means represented by batteries 56, 57 and 58 functions to govern the activation of the tube 54 and energization of the relay 55. This relay is connected in the plate circuit of the vacuum tube and is energized upon conduction of said tube to operate the armature 40 which controls the indictor and dispenser circuit 44 in the following manner.

The gap 37 in circuit 50 is closed by water dropping from the capillary tube 33, and electrical impulses are fed to the capacitor 52. When the detergency of the water is low and the flow rate of the drops is slow (Figure 3), electrical impulses occur at such frequency that the current flow is insufficient to effect charging of the capacitor 52 for developing the voltage level required to initiate conduction in the tube 54 and energize the relay 55. Accordingly the armature 40 remains in position to close the indicator and dispenser circuit 44. However, when the detergency of the water is high and the flow rate of the drops is fast (Figure 4), the electrical impulses occur at higher frequency resulting in a current flow sufficient to effect charging of the capacitor 52 and developing of a voltage level capable of activating the tube 54 so as to energize the relay 55, which then operates the armature 40 to open the indicator and dispenser circuit. This later condition persists so long as a high detergency condition exists.

An advantage gained by employing an arrangement as shown in Figure 2 is that the potentiometer can be adjusted to set the operating voltage level for tube 54 according to a predetermined flow rate at gap 37, thereby making it possible to adjust the system so as to insure its function in direct relation to the desired detergency condition of the washing solution.

While a complete system including an indicator and a detergent dispenser has been shown and described, it will be appreciated that if desired the system may be provided with an indicator only. In that case the indicator would inform the user whenever the washing liquid has a low detergent content and the user would then manually add detergent until the indicator becomes de-energized thereby indicating adequate detergency of the liquid. Also if desired, the system may include a dispenser only in which case the user would make sure that the dispenser contains a supply of detergent at the start of the machine which would then function automatically to add detergent whenever needed.

Moreover, if desired, the signaling device may be connected to become energized for indicating a condition where a sufficiency rather than insufficiency of detergent is present in the washing liquid. In that event it will be understood that the appropriate lead of said device, that is lead 41a, instead of being connected to the circuit 44 as shown in Figure 1, would be connected to a suitable terminal 60 adapted for electrical contact with the armature 40 so as to energize the signaling device when said armature is attracted by the relay 38 (Figure 1) or 55 (Figure 2) upon occurrence of a condition where sufficient detergent is present in the washing liquid.

It will also be appreciated that the same basic system illustrated in the drawing and herein described can be advantageously used for the purpose of controlling the rinsing cycle of the automatic washing machine. In that event the control device, either in the form shown in Figure 1 or in the form shown in Figure 2, would be coupled with the customary means which governs the rinsing operation. Thus, the system would provide for addition and overflow of rinse water until a predetermined minimum detergency condition develops in the rinsing liquid. The mentioned control device would sense this latter condition in the manner previously described, and would then bring about the termination of the rinsing cycle. Use of the system for this purpose results in assuring complete and proper rinsing with a minimum amount of rinse water regardless of the load or kind of clothes in the washing machine.

I claim:

1. A system for detecting the detergency of a liquid the surface tension of which varies in accordance with its detergent content, comprising passage means adapted to discharge liquid in drops at a rate affected by the surface tension of the liquid, and means including an electric circuit, a portion of which is interposed in the path of the drops and is controlled by said drops to generate electrical impulses at a rate commensurate with the discharge rate of said drops.

2. A system for detecting the detergency of a washing liquid the surface tension of which varies in accordance with its detergent content, comprising means for circulating said liquid, passage means for diverting a quantity of the circulated liquid and adapted to discharge diverted liquid in drops at a rate affected by the surface tension of the liquid, an electrical circuit having a normally open portion adapted to be closed by said drops for generating electrical impulses at a rate commensurate with the discharge rate of the diverted liquid drops, and a device the activation of which depends upon electrical impulses of predetermined frequency, said device being connected in said circuit to be activated thereby when said discharge rate becomes such that the frequency of the resulting electrical impulses attain said predetermined frequency.

3. A system as set forth in claim 2, in which the mentioned device is in the form of a frequency sensing relay.

4. A system as set forth in claim 2, in which the mentioned device includes an electronic tube and means for controlling the conduction in said tube in response to the mentioned impulses of predetermined frequency.

5. In a machine for washing clothes in washing liquid the surface tension of which varies in accordance with its detergent content, the combination of a tub, a clothes container mounted within said tub and having a portion for retaining washing liquid and a portion for overflowing a quantity of said liquid from said container to said tub, means for circulating overflowed liquid from said tub back to said container and including a restricted passage for delivering liquid at a discharge rate affected by the surface tension of the liquid, an electrical circuit controlled by the delivered liquid for generating electrical impulses at a frequency corresponding to the discharge rate of said delivered liquid, and instrumentalities operable in response to impulses of predetermined frequency, said instrumentalities being electrically coupled with said circuit to be energized thereby when said discharge rate results in the occurrence of electrical impulses corresponding to said predetermined frequency.

6. In a machine for washing clothes in washing liquid the surface tension of which varies in accordance with its detergent content, the combination of a tub, a clothes container mounted within said tub and having a portion for retaining washing liquid and a portion for overflowing a quantity of said liquid from said container to said tub, means for circulating overflowed liquid from said tub back to said container and including a header in which circulated liquid accumulates, a capillary tube for discharging drops of liquid from said header at a rate affected by the surface tension of the liquid, an electrical circuit having a gap disposed to be bridged by liquid drops to generate electrical impulses at a frequency corresponding to the rate at which said drops are discharged from said tube, control means including a relay operable in response to impulses of predetermined frequency, said relay being included in said circuit to be energized thereby when the liquid drops are discharged at a rate producing electrical impulses which correspond to said predetermined frequency.

7. The combination set forth in claim 6, in which indicating means is electrically connected with the mentioned relay to be operated thereby.

8. The combination set forth in claim 6, in which detergent dispensing means is electrically connected with the mentioned relay to be operated thereby.

9. The combination set forth in claim 6, in which indicating means and detergent dispensing means are electrically connected with the mentioned relay to be operated thereby.

10. Apparatus for testing a liquid as to its surface tension, comprising sensing means responsive to electrical impulses of a predetermined frequency, liquid passing means adapted to discharge the liquid in drops at a rate affected by the surface tension of said liquid, and an electrical circuit in which said sensing means is included, said circuit having a normally open portion adapted to be closed by said drops for generating electrical impulses at a rate commensurate with the discharge rate of said drops.

11. Apparatus as set forth in claim 10, in which the mentioned portion of the electrical circuit is in the form of a gap, and in which the mentioned passing means is in the form of a capillary tube having an outlet portion disposed in line with said gap.

References Cited in the file of this patent

UNITED STATES PATENTS

| | | |
|---|---|---|
| 2,186,987 | Nesset | Jan. 16, 1940 |
| 2,333,791 | Hutchison | Nov. 9, 1943 |
| 2,439,354 | Wolcott | Apr. 6, 1948 |
| 2,576,253 | Farrell et al. | Nov. 27, 1951 |
| 2,604,108 | Considine | July 22, 1952 |